Patented Apr. 6, 1954

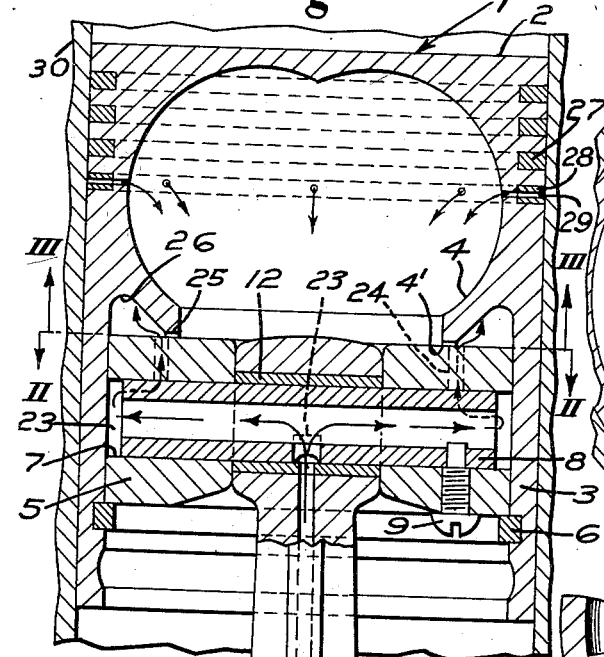

2,674,506

UNITED STATES PATENT OFFICE 2,674,506

ROTATABLE PISTON

Richard B. Dow, Buffalo, N. Y.

Application February 10, 1953, Serial No. 336,071

12 Claims. (Cl. 309—19)

This invention relates generally to the internal combustion engine piston art, and more specifically to pistons of the type which are rotatable in the engine cylinder.

The desirability of providing a piston which will rotate as it reciprocates within a cylinder, whereby to prevent scoring and irregular wearing of the cylinder wall, and thus enabling the piston and cylinder to wear evenly and obviating the necessity of periodically reboring the cylinder, is obvious. However, prior art arrangements for accomplishing this result have not been generally accepted for various reasons known in the art.

Accordingly, a primary object of this invention is to provide a practical piston arrangement incorporating improved means for rotating the piston as it is reciprocated in an engine cylinder.

Another object of this invention is to provide a rotatable piston arrangement as aforesaid utilizing a lubricating medium therefor under pressure to cause rotation of the piston.

It is also an object of this invention to provide a rotatable piston arrangement as aforesaid which is relatively simple in construction and economical to manufacture, and which is efficient and long-lasting in operation.

A rotatable piston arrangement according to my invention comprises essentially a rotatable piston, means for transmitting a lubricating medium thereto under pressure, and further means, being in a preferred embodiment a particular interior surface formation on the piston, which are acted upon by the lubricating medium under pressure to cause rotation of the piston.

The foregoing and other objects will become clearly apparent from the ensuing detailed description, taken together with the accompanying drawing forming a part thereof wherein:

Fig. 1 is a side view primarily in section of a preferred embodiment of my invention, with portions of the connecting rod and crankshaft being shown in elevation;

Fig. 2 is a sectional view taken about on line II—II of Fig. 1;

Fig. 3 is a sectional view taken about on line III—III of Fig. 1; and

Fig. 4 is an inverted fragmentary sectional view taken about on line IV—IV of Fig. 3.

In accordance with the preferred embodiment of my invention illustrated in the accompanying drawing there is provided a piston, generally designated 1, having a head 2 and a skirt 3. Head 2 has an interior crown portion 4 providing on its bottom surface an annular seat 4' spaced from the inner wall of face 3 and against which is seated the inner or upper end face of a piston insert or frame member 5, which insert is carried within skirt 3 and held in position therein against seating surface 4' as by means of a locking ring 6 fitted in an annular groove in the interior wall of skirt 3 adjacent the outer or lower end face of insert 5. Ring 6 is of any conventional type comprising, for example, a split-ring spring member, and the arrangement is such that the piston 1 is rotatable relative to insert 5.

Insert 5 is internally bored at 7 to receive therein a wrist pin 8, said pin 8 being secured against displacement in bore 7 relative to insert 5 as by means of a locking screw 9 extending through a wall of insert 5 into engagement with pin 8. Pin 8 is hollow and open at each end, with the ends thereof spaced inwardly from the ends of bore 7 for reasons which will become apparent.

Insert 5 is provided with a center opening therethrough, as shown at 10 in Fig. 2, whereby to expose the center portion of pin 8, and one end of a piston rod 11, carrying a bushing 12 of suitable bearing material, is fitted into opening 10 of insert 5 and around the center portion of pin 8. Opening 10 is larger than said piston rod end to permit limited rocking of rod 11 relative to piston 1.

At its lower end piston rod 11 carries a second bushing 12' of suitable bearing material which fits around a portion of a conventional crankshaft 13 which is journaled in suitable bearings such as shown at 14, whereby piston 1 can be reciprocated in a conventional manner.

As previously set forth, the rotatable piston arrangement of my invention incorporates means for supplying a lubricating and/or cooling medium to the piston under pressure, together with means utilizing such medium under pressure for rotating the piston, and this arrangement is as follows in a preferred embodiment. Lubricating medium such as oil is supplied to the interior of piston 1 under pressure by means of a conventional pump 15 having an inlet 16 adapted to communicate with a suitable source of supply such as the vehicle crank case, not shown, and having an outlet 17 connected to a conduit 18. Conduit 18 is connected to a passage extending through bearing 14 and its associated bushing and communicating with a circumferential groove 19 extending around crankshaft 13, which groove 19 in turn communicates with an interior passage 20 extending along crankshaft 13. A passage 21 extending through piston rod 11 communicates at one end with passage 20 of crankshaft 13 through a passage in bushing 12' and another circumferential groove 22 extending around crankshaft 13, and at its opposite end communicates with the hollow interior of pin 8 through a passage in bushing 12 and a groove 23 extending partly around pin 8, which groove opens into the hollow interior of pin 8. The lubricating medium then passes through pin 8 and out the opposite ends thereof which communicate with an annular recess 23 around insert 5, and from there out through openings 24 forming restricted discharge orifices spaced around insert 5 and extending from said annular passage 23 to the upper face of insert 5.

In this way the lubricating medium, which also serves as a cooling medium, is transferred under pressure from pump 15 through the crankshaft 13, piston rod 21 and wrist pin 8 into piston 1, as illustrated by the arrows in Figs. 1 and 4.

The crown portion 4 of head 2, which portion provides on its bottom surface the interior annular seat 4', is recessed at multiple points spaced around said annular seat 4' to provide a series of openings 25, and immediately behind openings 25 and seat 4' the bottom surface of crown portion 4 is recessed and provided with a series of blade or vane surfaces 26 somewhat in the nature of a turbine blade assembly with passages 25 extending between each of said blade or vane surfaces and the interior of piston 1, all as clearly illustrated in Fig. 3.

Vanes 26 are so designed and arranged that lubricating medium forced upwardly through passages 24 and impinging against said vanes will impart a force component thereto tangentially of piston 1 resulting in rotation of piston 1. Thus, the lubricating medium forced through openings 24 under pressure by means of pump 15 will impinge against one or more of vanes 26 to impart a rotational force thereto, the lubricating medium then passing outwardly through passages 25 and draining from there through opening 10 in insert 5 and out of the piston. While the rotation of piston 1 will be slight during any given instant, it will serve to provide the aforesaid advantages in that irregular wear and scoring of the cylinder wall will be prevented.

In this way, the instant invention provides a complete rotatable piston arrangement with lubricating medium passing under pressure to all moving parts of the piston arrangement and to the interior of the piston for cooling purposes. In addition, the lubricating medium under pressure is caused to impart a rotary movement to the piston as it reciprocates within the cylinder. In the preferred embodiment disclosed herein, I provide four openings 24 equally spaced around insert 5 whereby the lubricating medium will impinge upon vanes 26 at four equally spaced points to avoid binding of the piston as it is rotated relative to the insert and also to insure that the vanes are efficiently impinged upon regardless of the particular position of the vanes relative to said openings. Also, openings 24 are larger than the division walls between adjacent vanes 26 whereby at least a portion of a vane surface is always alined with each opening 24. However, the number of openings and arrangement of vanes can be varied if desired, the essential thing being to produce rotation by means of a medium under pressure acting against a vane or similar surface carried by the piston. In addition, I provide the usual piston rings 27 fitted in annular grooves around the exterior of head 2, one of said rings comprising an oil ring 28 having a passage 29 therethrough for picking up excess oil between piston 1 and the cylinder wall 30 and returning the same to the interior of piston 1 and then through opening 10 of insert 5 for return to the crankcase or other receptacle.

Therefore, it is clearly apparent that the instant invention has fully accomplished its aforesaid objects. While only a preferred embodiment has been disclosed herein, my invention is not limited to the details of such embodiment but includes all modifications and refinements thereof falling within the scope of the appended claims.

Having fully disclosed and completely described my invention, together with its mode of operation, what I claim as new is:

1. A rotatable piston arrangement comprising, a reciprocating piston, a piston rod, means connecting said piston to said rod with the former being rotatable about its axis of reciprocation relative to the latter, vane means carried by said piston, and means for directing a fluid medium under pressure against said vane means to cause rotation of said piston.

2. A rotatable piston arrangement comprising, a piston, a piston rod, a wrist pin assembly interconnecting said piston and said rod with said piston being rotatable relative to said wrist pin assembly, vane means carried by said piston interiorly thereof, and means for directing a fluid medium under pressure through said rod and said wrist pin assembly and against said vane means to cause rotation of said piston.

3. A rotatable piston arrangement comprising, a piston having a head portion and a skirt portion, a wrist pin insert member carried within said skirt portion with said piston being rotatable relative to said insert member, wrist pin means carried by said insert member, a piston rod connected to said wrist pin means, fluid passage means extending through said rod and said wrist pin means and said insert member and terminating in restricted orifice means directed toward said head portion, and vane means carried by said piston interiorly thereof in alinement with said orifice means for imparting a rotary movement to said piston when impinged upon by a fluid medium forced through said passage means under pressure.

4. The rotatable piston arrangement set forth in claim 3, wherein said orifice means comprise multiple discharge orifices equally spaced around said piston, and said vane means comprise an annular series of vanes alined with said orifices, said orifices being larger than the space between adjacent vanes.

5. The rotatable piston arrangement set forth in claim 3, wherein said insert member comprises a member of circular form in plan view having a transverse bore extending therethrough and an annular recess extending therearound in communication with said orifice means, said wrist pin means comprising a tubular member fitted within said bore and terminating short of the ends thereof, and said insert member having a center opening therein receiving said piston rod for engagement thereof with said wrist pin member.

6. A rotatable piston arrangement comprising, a piston having a head portion and a skirt portion, said head portion including a crown portion formed to provide an interior annular seat on its bottom surface adjacent said skirt portion and spaced from the inner wall thereof, a wrist pin assembly mounted within said skirt portion against said seat with said piston being rotatable relative to said wrist pin asembly, a piston rod connected to said wrist pin assembly, vane means on the bottom surface of said crown portion intermediate said seat and the inner wall of said skirt portion, and fluid passage means extending through said piston rod and said wrist pin assembly to spaced discharge orifices directed against said vane means, whereby fluid such as lubricating oil forced through said passage means and said spaced discharge orifices under pressure will impinge against said vane means to cause rotation of said piston, and additional fluid passage means extending between said vane means and the interior of said head portion.

7. The rotatable piston arrangement set forth in claim 6, wherein said additional fluid passage means comprise spaced recesses in said annular seat.

8. The rotatable piston arrangement set forth in claim 6, wherein said piston is provided exteriorly thereof with ring means having fluid passage means therethrough for delivering excess lubricating oil from a cylinder wall to the interior of said piston.

9. The rotatable piston arrangement set forth in claim 6, together with fluid passage means through said wrist pin assembly for discharge of the fluid from the interior of said piston.

10. A rotatable piston arrangement comprising, a piston, a piston rod, a wrist pin assembly interconnecting said piston and said rod, said piston being rotatable relative to said wrist pin assembly, an annular series of vanes arranged interiorly of said piston, and fluid passage means extending through said rod and said wrist pin assembly and terminating in spaced discharge orifices directed against said vanes, whereby fluid such as lubricating oil forced through said passage means under pressure will impinge against said vanes to rotate said piston.

11. A rotatable piston comprising, a head portion, a skirt portion, said head portion terminating in an undercut crown portion at said skirt portion, and vane means carried by said undercut crown portion for receiving thereagainst a fluid medium under pressure to impart a rotary motion to said piston.

12. In a rotatable piston arrangement, a hollow piston, reciprocable drive means mounting said piston for rotation about its axis, vane means carried interiorly of said piston, means for supplying a lubricating medium under presure to the interior of said piston, and means for directing such lubricating medium under pressure against said vane means to impart a rotary movement to said piston.

References Cited in the file of this patent

UNITED STATES PATENTS

| Number | Name | Date |
| --- | --- | --- |
| 1,216,757 | Williams | Feb. 20, 1917 |
| 1,637,765 | Comstock | Aug. 2, 1927 |
| 2,369,500 | Waeber | Feb. 13, 1945 |
| 2,379,359 | Kettering | June 26, 1945 |
| 2,387,467 | Reiter | Oct. 23, 1945 |
| 2,568,828 | Schrader | Sept. 25, 1951 |